(12) United States Patent
Kitamura et al.

(10) Patent No.: US 7,065,138 B2
(45) Date of Patent: Jun. 20, 2006

(54) VIDEO SIGNAL QUANTIZING APPARATUS AND METHOD THEREOF

(75) Inventors: Takuya Kitamura, Tokyo (JP); Akira Sugiyama, Kanagawa (JP); Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/078,067

(22) Filed: Mar. 10, 2005

(65) Prior Publication Data

US 2005/0157785 A1    Jul. 21, 2005

Related U.S. Application Data

(63) Continuation of application No. 10/296,756, filed as application No. PCT/JP02/03254 on Apr. 1, 2002, now Pat. No. 6,865,225.

(30) Foreign Application Priority Data

Mar. 30, 2001    (JP)    ............................. 2001-100998

(51) Int. Cl.
    *H04N 7/12*    (2006.01)
(52) U.S. Cl. ............ 375/240.03; 375/240; 375/240.01; 375/240.02; 375/240.12
(58) Field of Classification Search ................ 375/240, 375/240.01, 240.02, 240.03, 240.12
See application file for complete search history.

(56) References Cited

U.S. PATENT DOCUMENTS 5,731,835 A    3/1998    Kuchibholta 5,805,222 A    9/1998    Nakagawa et al.
6,091,767 A *  7/2000    Westerman ................. 375/240

FOREIGN PATENT DOCUMENTS

| JP | 10-108183 | 4/1998 |
|----|-----------|--------|
| JP | 10-108184 | 4/1998 |
| WO | WO 96/28937 | 9/1996 |
| WO | WO 98/35500 | 8/1998 |

\* cited by examiner

*Primary Examiner*—Allen Wong
(74) *Attorney, Agent, or Firm*—Frommer Lawrence & Haug LLP; William S. Frommer

(57) ABSTRACT

A residue code amount is calculated. A threshold act_thrsh corresponding to the residue code amount is obtained. A variable mb that designates a macro block is initialized to zero. The variable mb is compared with the total number of macro blocks. When the variable mb matches the total number of macro blocks, the process is completed. Otherwise, the rank of the activity information of the macro block designated by the variable mb is compared with the rank of the threshold act_thrsh. When the rank of the activity information is lower than the rank of the threshold act_thrsh, since there is a possibility of which q_scale can be decreased, q_scale is calculated with the activity information of the macro block mb and min_qq. q_scale of the macro block is subtracted from the total code amount. The subtracted resultant data is stored in a variable tmp. Thereafter, the variable tmp is compared with a target code amount GEN_TGT. When the variable tmp is equal to or smaller than the target code amount GEN_TGT, since the quantizing step can be fined down, the quantizing step of the macro block mb is decreased by one.

1 Claim, 8 Drawing Sheets

Fig. 6A

| OPERATIONS PERFORMED FOR QUANTIZING STEPS IN CONSIDERATION OF ACTIVITY | | | | |
|---|---|---|---|---|
| | ×k | ×0.5 | ×1.0 | ×2.0 |
| Qref | 1 | — | 1 | 2 |
| | 2 | 1 | 2 | 4 |
| | 4 | 2 | 4 | 8 |
| | 8 | 4 | 8 | 16 |
| | 16 | 8 | 16 | — |

Fig. 6B

| | | mb0(=x2.0) | mb1(=x0.5) | mb2(=x2.0) | mb3(=x1.0) |
|---|---|---|---|---|---|
| Qref | 2 | 4 | 1 | 4 | 2 |
| | 4 | 8 | 2 | 8 | 4 |
| | 8 | 16 | 4 | 16 | 8 |

| k<br>$Q^{ref}$ | 0.5 | 0.75 | 1.0 | 1.5 | 2.0 |
|---|---|---|---|---|---|
| 10 | 5 | 7.5 | 10 | 15 | 20 |
| AFTER ROUNDING | 5 | 8 | 10 | 15 | 20 |
| −1 | 4 | 7 | 9 | 14 | 19 |
| RANK | 2 | 1 | 3 | 4 | 5 |
| 11 | 5.5 | 8.25 | 11 | 16.5 | 22 |
| AFTER ROUNDING | 6 | 8 | 11 | 17 | 22 |
| −1 | 5 | 7 | 10 | 16 | 21 |
| RANK | 1 | 5 | 3 | 2 | 4 |

VIDEO SIGNAL QUANTIZING APPARATUS AND METHOD THEREOF

This is a continuation of U.S. patent application Ser. No. 10/296,756, filed Nov. 27, 2002 now U.S. Pat. No. 6,865,225 which is a 371 PCT application No. PCT/JP02/03254 filed Apr. 1, 2002, the entirety of which is incorporated herein by reference.

TECHNICAL FIELD

The present invention relates to a video signal quantizing apparatus and a method thereof applicable for an encoding process using for example DCT (Discrete Cosine Transform).

BACKGROUND ART

In a video compressing system using DCT typified by MPEG (Moving Pictures Expert Group) standard, a code amount is controlled so that a bit stream is transmitted at a desired rate to a transmission path. For example, by controlling a quantizing index that represents a quantizing step, the code amount is controlled. In a code amount control proposed as TM5 of the MPEG2 standard, using the relation among the remaining amount of a virtual buffer, a quantizing index of a preceding encoding process, and a generated code amount, a quantizing step is fed back.

FIG. 1 shows the structure of layers of the MPEG system. The MPEG system prescribes a hierarchical structure composed of a sequence layer, a GOP (Group Of Picture) layer, a picture layer, a slice layer, and a macro block layer. More practically, as shown in FIG. 1, when a quantizing step is varied with data contained in the slice layer and the macro block layer (this data is referred to as Q scale), the code amount in a fixed period such as one frame is adjusted. For example, in (4:2:0) format, one macro block is composed of four blocks of a luminance signal, one block of a chrominance signal U, and one block of a chrominance signal V.

For example, the Q scale q_scale has 31 values Q1 to Q31. As the Q scale value becomes large, the quantizing step becomes large. As shown in FIG. 2, there is a relation between the quantizing step and total code amount in such a manner that as the quantizing step becomes large, the quantizing process is coarsely performed and the total code amount becomes small and that as the quantizing step becomes small, the quantizing process is finely performed and the total code amount becomes large. In addition, since the quantizing process is performed with discrete values, the total code amount becomes a discrete value.

A conventional application such as a communication uses the relation between a preceding quantizing step and the total code amount so as to feed back the current average rate. In other words, when the current average rate is higher than a target rate, the quantizing step is slightly roughed up and thereby the total code amount is decreased. In contrast, when the current average rate is lower than the target rate, the quantizing step is slightly fined down and thereby the total code amount is increased. In such a manner, a control is performed so that the target rate is averagely accomplished. In other words, although the total code amount is increased and decreased in a short time period, the total code amount averagely becomes the target value in a long time period.

However, in an application such as a VTR (Video Tape Recorder or VCR: Video Cassette Recorder) that is used on the assumption that an editing operation is performed, when the total code amount is controlled only with the average rate, a problem takes place. In such an application, since an editing operation may be performed for each frame, a control is required so that the total code amount in each edit unit should not exceed a predetermined amount. In the following description, such a control is referred to as fixed length code amount control.

Since the forgoing feedback control cannot accomplish the fixed length code amount control, a reproduced picture is fatally deteriorated. Alternatively, with an excessive margin to prevent a code amount from exceeding a target value, the picture quality may be deteriorated. To solve such a problem, a technology for performing a quantizing process using a plurality of fixed quantizers having different quantizing steps and controlling the quantizing process using a total code amount is known. For example, in International Patent Laid Open Publication No. WO96/28937, a feed-forward type code amount control is disclosed.

In reality, quantizers each having 31 Q scales as shown in FIG. 2 are disposed. The total code amount of DCT coefficients quantized by each quantizer is obtained for one frame period (alternatively term "screen" may be used). A Q scale that satisfies conditions of which the total code amount does not exceed the target code amount and of which the difference to the target code amount is small is decided. In the example shown in FIG. 2, Q4 is a Q scale that satisfies such conditions.

However, there is a problem how to decide a quantizing step corresponding to the total code amounts of for example 31 Q scales. Since Q scales are discrete values, bit rate values are also discrete values. Thus, the bit rate cannot be finely controlled. As a result, the difference to the target code amount cannot become sufficiently small.

Therefore, an object of the present invention is to provide a video signal quantizing apparatus and a method thereof that allow a code amount control to be performed corresponding to an activity so that the total code amount does not exceed a target code amount and that the difference between the target code amount and the total code amount becomes small.

DISCLOSURE OF THE INVENTION

Claim 1 of the present invention is a video signal quantizing apparatus for quantizing a video signal in each equal length unit composed of a plurality of blocks within a target code amount, the apparatus comprising:

a total code amount detecting means (quantizers 10-1 to 10-n, code amount detectors 11-1 to 11-n, memory 12, and min_qq deciding portion 13 shown in FIG. 3 and memory 303 and adding device 304 shown in FIG. 5) for obtaining a total code amount generated in the equal length unit of the video signal with each of a plurality of quantizing steps when the video signal is quantized with the plurality of different quantizing steps;

a first deciding means (min_qq deciding portion 13 shown in FIG. 3 and comparator 307 and register 308 shown in FIG. 5) for deciding a first quantizing step from the plurality of quantizing steps, the first quantizing step being a quantizing step with which the total code amount is smaller than a target code amount and a difference of the total code amount and the target code amount is minimum;

an activity detecting means (activity calculating circuit 15 shown in FIG. 3) for detecting an activity for each block of the video signal;

a second deciding means (min_qq deciding portion 13 shown in FIG. 3) for deciding a second quantizing step by varying the first quantizing step according to the activity of each block;

a residue code amount detecting means (min_qq deciding portion 13 shown in FIG. 3 and step S1 shown in FIG. 9) for detecting a residue code amount that is a difference between a code amount of which all of the plurality of blocks in the equal length unit of the video signal are quantized with the first quantizing step and the total code amount;

a priority rank deciding means (internal table of Q_final deciding portion 14 shown in FIG. 3) for deciding a priority rank of each block according to an error by rounding when the second quantizing step is decided in consideration of the activity;

a third deciding means (Q_final deciding portion 14 shown in FIG. 13) for deciding a third quantizing step by varying the second quantizing step for a block selected according to the priority rank; and a quantizing means (quantizing portion 6 shown in FIG. 3) for quantizing each block with a quantizing step decided by the second deciding means or the third deciding means.

Claim 4 of the present invention is a video signal quantizing method for quantizing a video signal in each equal length unit composed of a plurality of blocks within a target code amount, the method comprising the step of obtaining a total code amount generated in the equal length unit of the video signal with each of a plurality of quantizing steps when the video signal is quantized with the plurality of different quantizing steps, deciding a first quantizing step from the plurality of quantizing steps, the first quantizing step being a quantizing step with which the total code amount is smaller than a target code amount and a difference of the total code amount and the target code amount is minimum, detecting an activity for each block of the video signal, deciding a second quantizing step by varying the first quantizing step corresponding to the activity of each block, detecting a residue code amount that is a difference between a code amount of which all of the plurality of blocks in the equal length unit of the video signal are quantized with the first quantizing step and the total code amount, deciding a priority rank of each block according to an error by rounding when the second quantizing step is decided in consideration of the activity, deciding a third quantizing step by varying the second quantizing step for a block selected according to the priority rank, and quantizing each block with a quantizing step decided by the second deciding means or the third deciding means.

BRIEF DESCRIPTION OF DRAWINGS

FIG. 6 is a schematic diagram for explaining the relation between quantizing steps $Q^{ref}$ and $Q^{act}$ according to the embodiment of the present invention.

BEST MODES FOR CARRYING OUT THE INVENTION

Figure 3:
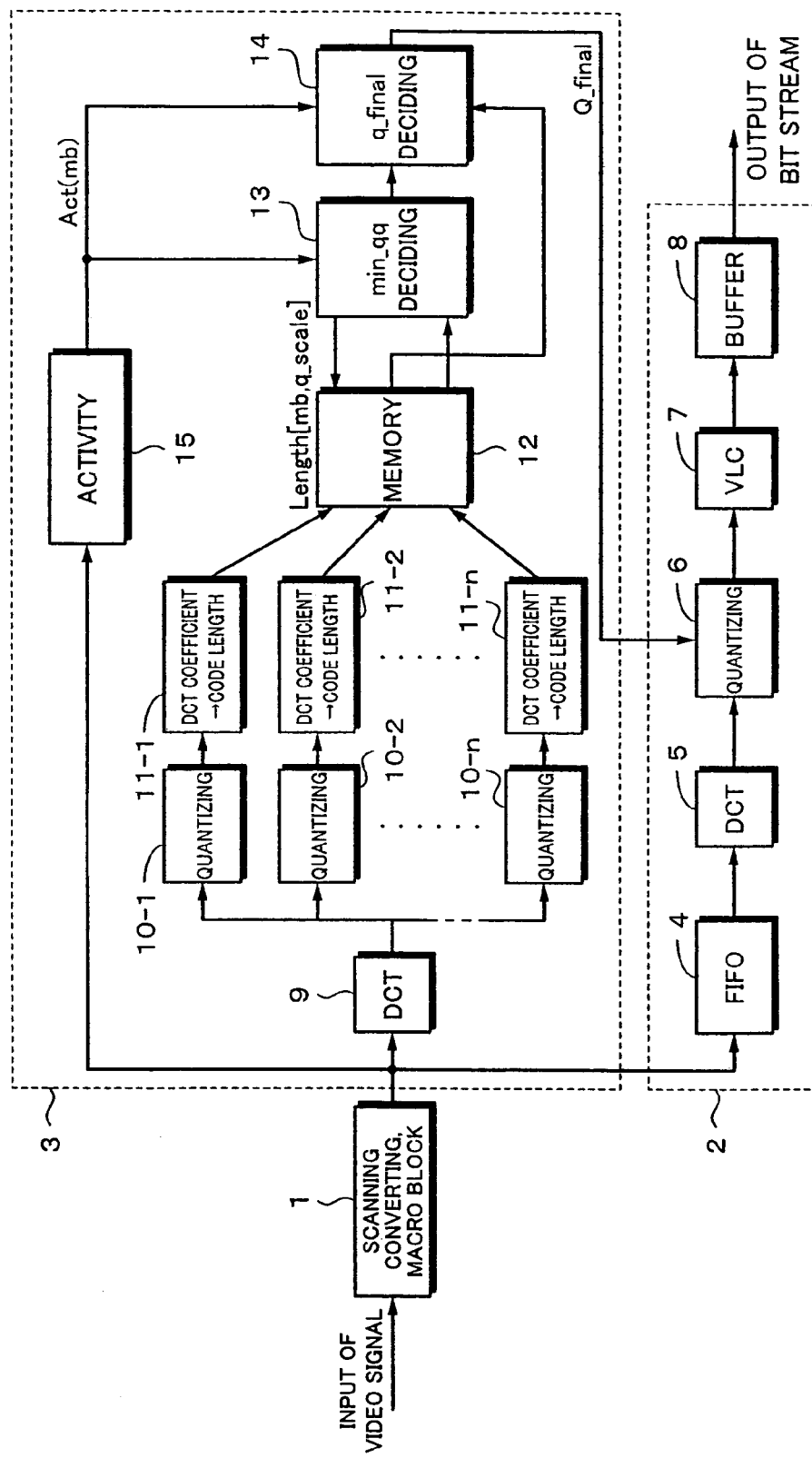
FIG. 3 is a block diagram showing the overall structure of an embodiment of the present invention.

Next, with reference to the accompanying drawings, an embodiment of the present invention will be described. FIG. 3 shows the overall structure of an encoder according to the present invention. For example, the encoder is controlled so that the total code amount is fixed in the unit of one frame (namely one screen). In FIG. 3, reference numeral 1 represents a scanning converting portion. The scanning converting portion 1 divides an input video signal into macro blocks. When the input video signal is a progressively scanned signal, the scanning converting portion 1 directly divides the signal into macro blocks. When the input video signal is a interlaced scanned signal, the scanning converting portion 1 converts the signal into a field frame and divides it into macro blocks. In the MPEG system, one macro block is composed of a total of six DCT blocks that are four DCT blocks having a size of (16×16) of a luminance signal, one DCT block having a size of (8×8) of a chrominance signal Cr, and one DCT block having a size of (8×8) of a chrominance signal Cb (4:2:0).

Data of macro blocks is supplied from the scanning converting portion 1 to a main system 2 and a predicting system 3. The main system 2 is composed of a FIFO represented by reference numeral 4, a DCT processing portion represented by reference numeral 5, a quantizing portion represented by reference numeral 6, a VLC (Variable Length Coding) portion represented by reference numeral 7, and a buffer represented by reference numeral 8.

The DCT processing portion 5 performs an intra encoding process. In other words, the DCT processing portion 5 performs a DCT process for an input pixel value. Quantizing steps Q_final [mb] that have been decided for individual macro blocks by the predicting system 3 are supplied to the quantizing portion 6. The quantizing portion 6 quantizes DCT coefficients with the quantizing steps Q_final [mb]. The FIFO 4 is a delaying device that compensates a time period for which the predicting system 3 decides the quantizing steps Q_final.

The VLC portion 7 encodes the quantized DCT coefficients supplied from the quantizing portion 6 with a variable length code. Output data of the VLC portion 7 is supplied to the buffer 8. The buffer 8 smoothens the output data of the VLC portion 7 and outputs the smoothened bit stream.

The predicting system 3 is composed of a DCT processing portion represented by reference numeral 9, n quantizers denoted by reference numerals 10-1, 10-2, . . . , and 10-n, n code amount detectors represented by reference numerals 11-1, 11-2, . . . , and 11-n, a memory represented by reference numeral 12, a min_qq deciding portion represented by reference numeral 13, a Q_final deciding portion represented by reference numeral 14, and an activity calculating circuit 15. The quantizing steps are supplied from the Q_final deciding portion 14 to the quantizing portion 6 of the main system 2.

The n quantizers 10-1, 10-2, ..., and 10-n quantize DCT coefficients with different quantizing steps. The quantized DCT coefficients generated by the individual quantizers are supplied to the code amount detectors 11-1, 11-2, ..., and 11-n. The code amount detectors 11-1, 11-2, ..., and 11-n generate code amounts of individual macro blocks. As with the VLC portion 7, the code amount detectors 11-1, 11-2, ..., and 11-n encode the quantized DCT coefficients with a variable length code and collect variable length codes of the individual macro blocks. The quantized code amounts of the individual macro blocks are stored in the memory 12.

In the memory 12, code amounts quantized with q_scale for the individual macro blocks mb are stored as a two-dimensional array Length [mb, q_scale]. For example, when the number of macro blocks of one screen is 1350 and the number of types of quantizing steps is 31, addresses of one of vertical direction and horizontal direction are from (mb=1) to (mb=1350), whereas addresses of the other direction are from (q_scale=1) to (q_scale=31). In these addresses, code amount data of the macro blocks is stored.

Figure 1:
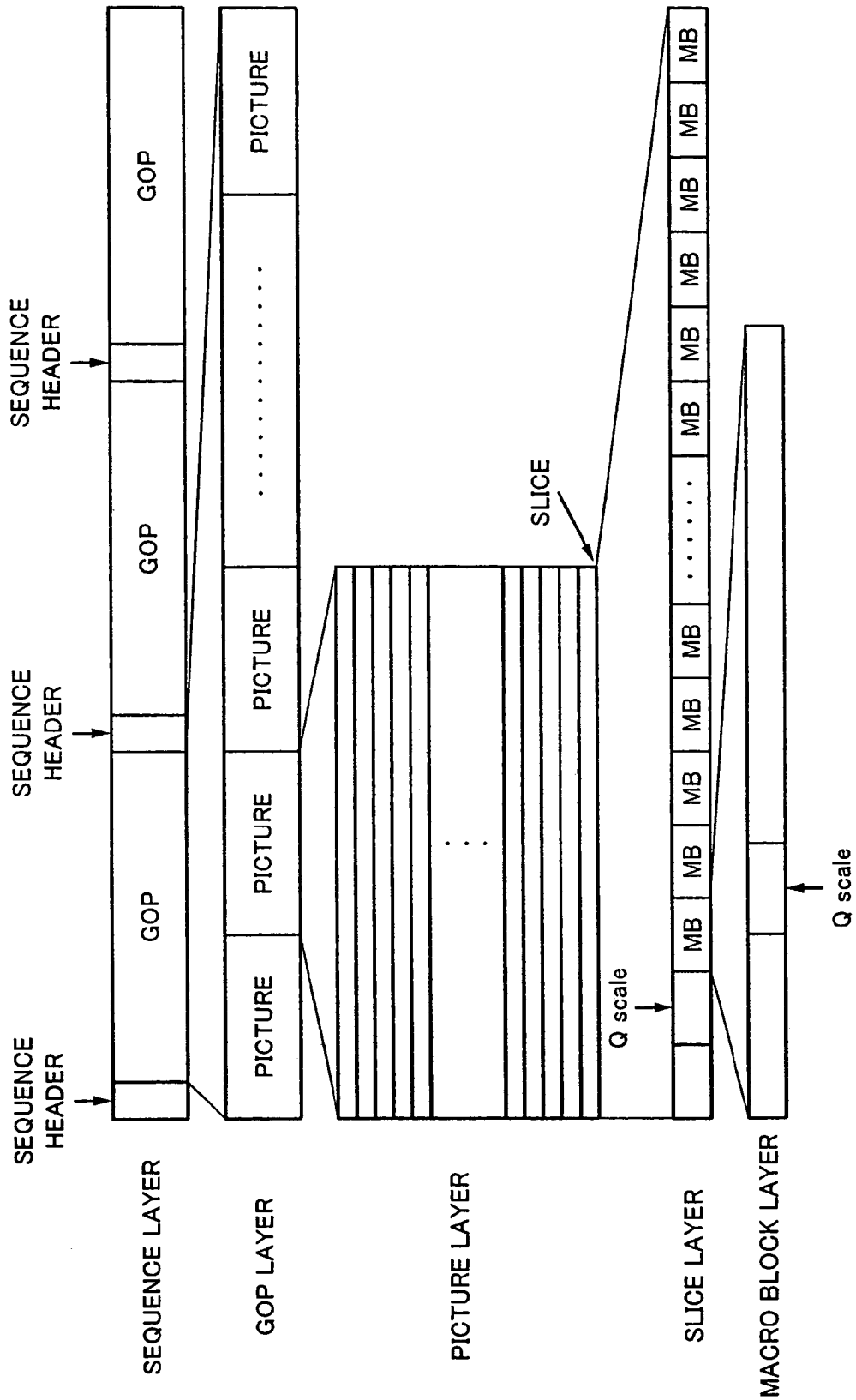
FIG. 1 is a schematic diagram showing an example of a method for transmitting data of quantizing steps.
Figure 2:
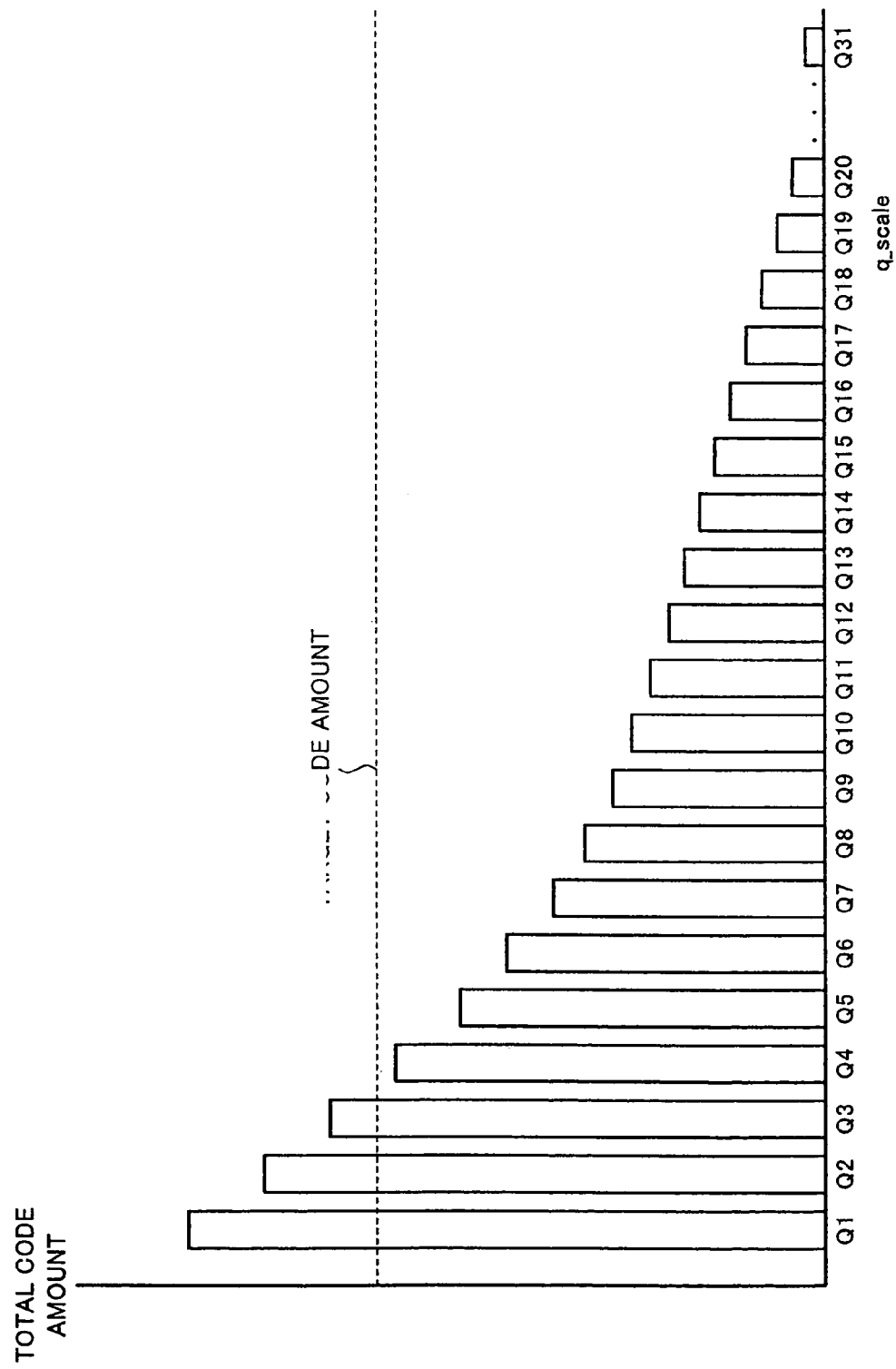
FIG. 2 is a schematic diagram showing an example of the variation of total code mounts on one screen corresponding to quantizing steps.

With code amounts stored in the memory 12, one quantizing step is selected for each macro block. A combination of quantizing steps of macro blocks is searched so that the sum of code amounts of macro blocks of one screen does not exceed a target code amount GEN_TGT (see FIG. 2) and is the closest thereto. To do that, the activity calculating circuit 15 is disposed. The activity calculating circuit 15 calculates activity information Act (mb) of each macro block. Activities Act (mb) are supplied to the min_qq deciding portion 13 and the Q_final deciding portion 14.

The min_qq deciding portion 13 obtains a reference quantizing min_qq from the reference quantizing steps $Q^{ref}$ using the content of the memory 12 so that the total code amount does not exceed the target code amount and has the minimum difference therewith. The reference quantizing min_qq is supplied to the Q_final deciding portion 14. The Q_final deciding portion 14 decides Q_final that is the final quantizing step using the content of the memory 12.

The Q_final deciding portion 14 stores the decided quantizing steps for individual macro blocks mb in the form of an array Q_final [mb]. This information is transmitted to the main system 2. The quantizing portion 6 of the main system 2 quantizes DCT coefficients with the quantizing steps Q_final [mb] detected for the individual macro blocks mb_no.

In such a process, the above mentioned fixed length code amount control that restricts the total code amount in the equal length unit (for example, in the unit of one screen) to a desired amount or less can be accomplished. In this control, it is important to find a combination of quantizing steps with which the total code amount does not exceed the target code amount GEN_TGT and is the closest thereto. In the example shown in FIG. 2, with Q3, the total code amount exceeds the target code amount GEN_TGT. With Q4, the total code amount does not exceed the target code amount GEN_GT and is the closest thereto. However, with Q4, there is a difference between the total code amount and the target code amount GEN_TGT. In this case, it is preferred to minimize the difference.

To decrease the difference, it is effective to vary quantizing steps using activity information of macro blocks. An activity represents a characteristic of a local picture of the screen. In the case of a component signal, an activity is calculated using a luminance signal.

As is known, as an activity of a macro block, several methods such as the sum of absolute values of differences can be used. For example, an activity can be represented with the variance of a plurality of pixel values that compose a macro block as expressed in Formula (1). In Formula (1), N represents the number of pixels that compose a macro block; x represents a pixel value; Σ represents the sum of N pixels; and x^ represents the average value of pixel values of a macro block.

$$act\ (mb) = 1/N \cdot \Sigma (x - x\hat{\ })^2 \quad (x\hat{\ } = 1/N \cdot \Sigma x) \qquad (1)$$

Figure 4:
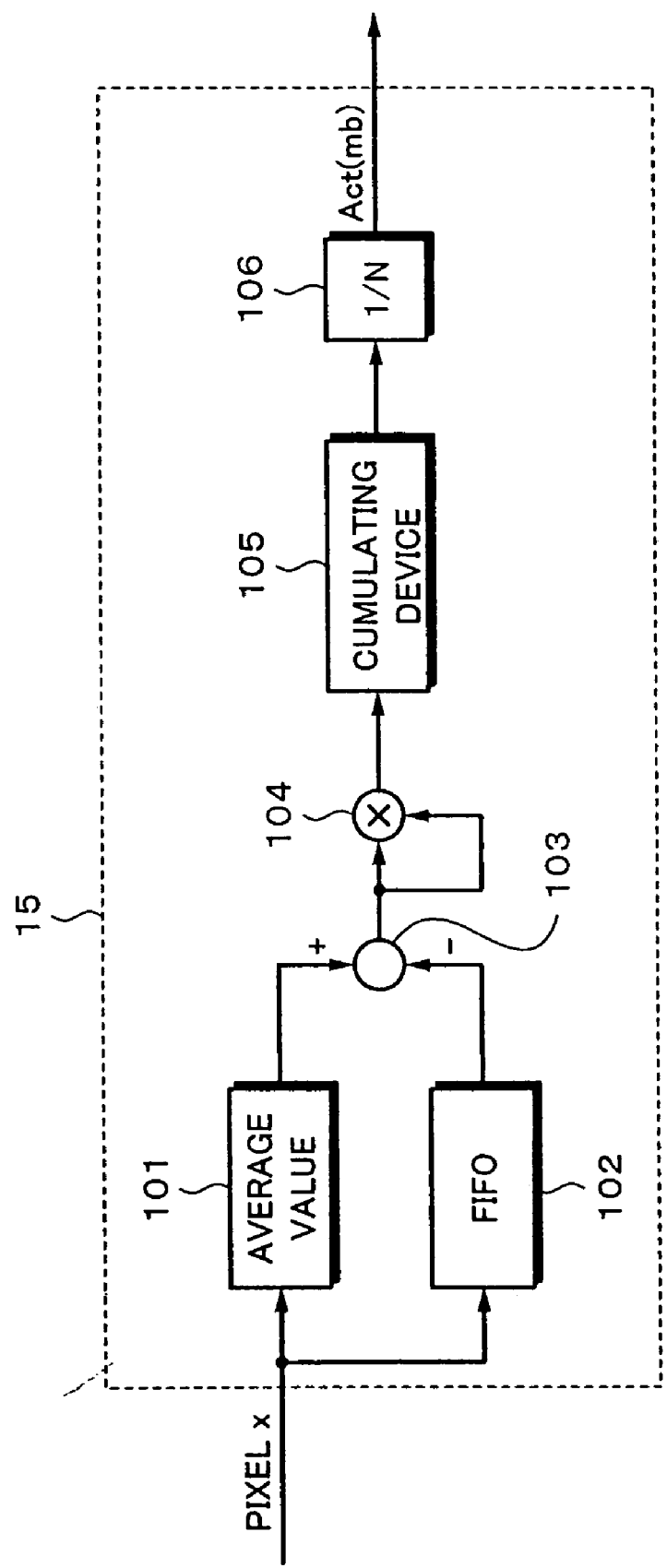
FIG. 4 is a block diagram showing an example of an activity calculating circuit.

FIG. 4 shows the structure of the activity calculating circuit 15 that calculates an activity. Reference numeral 101 represents an average value calculating circuit that calculates the average value of pixel values of a macro block. Reference numeral 102 represents a FIFO as a delaying device that adjusts time. Reference numeral 103 represents a subtracting device that calculates the difference between each pixel value and the average value. The difference is squared by a square calculating device represented by reference numeral 104. A cumulating device 105 cumulates the squares of the differences. A dividing circuit represented by reference numeral 106 divides the cumulated value by N. The dividing circuit 106 generates activity information Act (mb) expressed by Formula (1).

When the quantizers 10-1, 10-2, ..., and 10-n of the predicting system 3 quantize DCT coefficients, they do not consider an activity of a macro block. Each quantizer quantizes DCT coefficients of one screen with a Q scale. The activity calculating circuit 15 shown in FIG. 3 has the structure shown in FIG. 4.

For a constant value $Q^{ref}$ applicable for one screen, quantizing steps $Q^{act}$ (mb) considering activities of individual macro blocks are obtained. With code amounts Length [mb, $Q^{act}$ (mb)] of macro blocks quantized with the quantizing steps, the total code amount of one screen is obtained. The min_qq deciding portion 13 obtains $Q^{ref}$ as a reference quantizing min_qq with which the total code amount does not exceed the target code amount GEN_TGT and has the minimum difference therewith.

Next, a method for obtaining the reference quantizing min_qq will be described. As was described above, the predicting system 3 quantizes DCT coefficients with 31 types of Q scales and stores Length [mb, q_scale] in the memory 12. In this case, the predicting system 3 does not consider activities of macro blocks. When a quantizing step q_scale is $Q^{act}$ of which an activity of the current macro block is considered for a reference quantizing step $Q^{ref}$, the obtained code amount is cumulated for one screen with $Q^{ref}$ as an index. Thus, when the process of the predicting system has been completed for one screen, the total code amount of the screen is obtained with each reference quantizing $Q^{ref}$ in consideration of activities of macro blocks.

When a rate control is performed, $Q^{ref}$ is discretely varied and a reference quantifying $Q^{ref}$ with which the total code amount does not exceed the target code amount GEN_TGT and has the minimum difference therewith is obtained. As a result, min_qq is obtained. In this process, comparisons are performed the number of times corresponding to the number of $Q^{ref}$.

Figure 5:
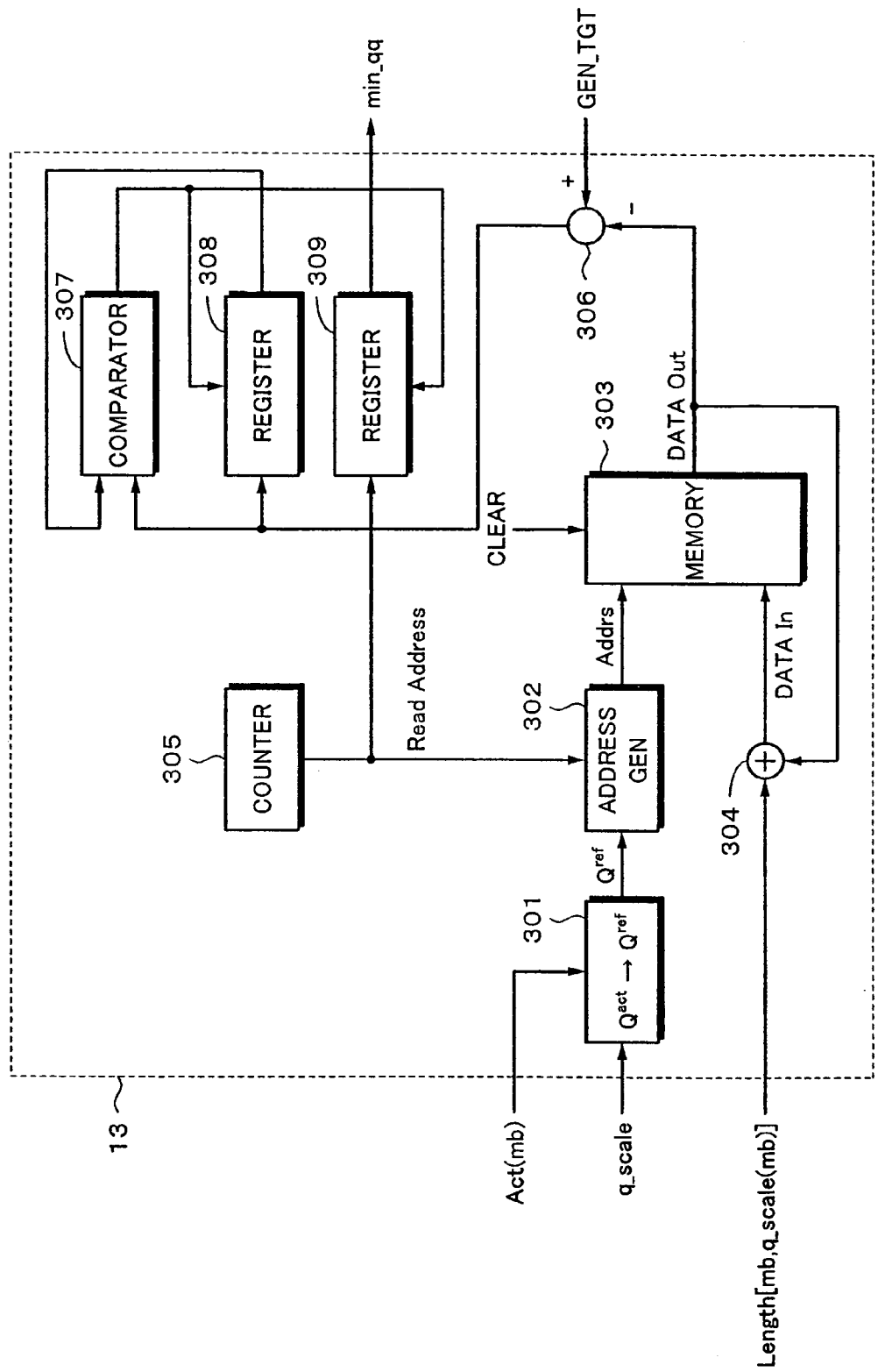
FIG. 5 is a block diagram showing an example of a quantizing step deciding portion according to the embodiment of the present invention.

To accomplish the forgoing process, the predicting system 3 is provided with the min_qq deciding portion 13. FIG. 5 shows the structure of an example of the min_qq deciding portion 13. The input data is activity information Act (mb) of the current macro block (mb-th macro block), Q scale, and a code amount Length (mb) of which the macro block is quantized with the Q scale. Since the min_qq deciding portion 13 supplies an address to the memory 12 and receives Length (mb) corresponding to the address from the memory 12, the min_qq deciding portion 13 can obtain the value of the Q scale. One Act (mb) is decided for each macro block. The quantizers 10-1, 10-2, ..., and 10-n use different Q scales for individual macro blocks and calculate Length (mb) for the individual macro blocks. The activity information Act (mb) is supplied from the activity calculating circuit 15. The code amounts Length (mb) are read from the memory 12. Code amounts Length (mb) corresponding to n Q scales in the order form the first macro block to the last macro block of one screen are successively supplied to the min_qq deciding portion 13.

Act (mb) and a Q scale are supplied to a mapping portion represented by reference numeral 301. The mapping portion 301 converts a Q scale ($Q^{act}$) that has been input in the reverse relation with the following Formula (2) into $Q^{ref}$. In other words, assuming that an activity has been considered for the Q scale, the mapping portion 301 outputs $Q^{ref}$ for which an activity has not been considered.

Assuming that a quantizing step (actually used quantizing step) for which an activity is considered is $Q^{act}$ (mb) in comparison with the reference quantizing step $Q^{ref}$, $Q^{act}$ (mb) can be expressed by Formula (2). In this case, a control for restricting the total code amount to the target code amount or less is ignored. The reference quantizing step $Q^{ref}$ means a quantizing step with which the entire screen is quantized without consideration of activities. According to the embodiment, an activity as local information of a screen is considered. Introducing a virtual $Q^{ref}$, it is varied corresponding to activities. $Q^{ref}$ that is changed is constant corresponding to activities regardless of the value of $Q^{ref}$.

$$Q^{act}(mb) = f_{map}(Q^{ref}(mb), act(mb)) \quad (2)$$

where function $f_{map}()$ is used to calculate $Q_{act}$ (mb) with act (mb) and $Q^{ref}$. For example, a function used in MPEG TM (Test Model) 5 is expressed as Formula (3).

$$f_{map\ TM}(Q^{ref}(mb), act(mb)) = [(2.0 \times act(mb) + N\_act)/(act(mb) + 2.0 \times N\_act)] \times Q^{ref}(mb) \quad (3)$$

Although N_act is the average value of act (mb) in the current frame, in consideration of the system delay, the value of the preceding frame may be used. When the relation of act (mb)=N_act is satisfied in Formula (3), coefficient k by which $Q^{ref}$ is multiplied is 1. When act (mb)=0, the coefficient k by which the $Q^{ref}$ is multiplied is 0.5. The value of the coefficient K is in the range from 0.5 to 2. With such a function $f_{map}()$, $Q^{act}$ (mb) is calculated. Although the activity information Act (mb) is a continuous value (that has at least one decimal place), even if it is a typical value that is properly rounded (for example, a typical value of 16 steps), a sufficient picture quality can be obtained.

As a simple example, it is assumed that one frame contains four macro blocks and that operations performed for quantizing steps in consideration of activity information Act (mb) of the individual macro blocks are (×0.5, ×1.0, ×0.5, and ×2.0). When the reference quantizing $Q^{ref}$ is 10, the quantizing $Q^{act}$ in consideration of activity information Act (mb) of the macro blocks are (5, 10, 5, and 20). The mapping portion 301 generates reference quantizing $Q^{ref}$ with $Q^{act}$ and Act (mb). When Act (mb)=0.5 and $Q^{act}$=10 are supplied to the mapping portion 301, it is clear that $Q^{ref}$ is 20.

The reference quantizing $Q^{ref}$ is supplied from the mapping portion 301 to an address generating portion 302. The address generating portion 302 generates an address of a memory 303 with $Q^{ref}$. At the beginning of a frame, the memory 303 is cleared. When there are 31 $Q^{ref}$ values, there are 31 addresses of the memory 303. 31 Q scale values and the corresponding Length values for each macro block of one screen are input to the min_qq deciding portion 13.

When an address is supplied to the memory 303, the current code amount written in the address is read from the memory 303 and fed back to an adding device 304. The adding device 304 adds the data amount that is read from the address of the memory 303 and the input Length and writes the added result to the same address of the memory 303. In other words, the adding device 304 performs a cumulating operation. Thus, when macro blocks of one screen have been processed, the total code amount of each $Q^{ref}$ is stored in the memory 303.

Next, a count value of a counter represented by reference numeral 305 is supplied to the address generating portion 302 and a register 309. The count value decrements to for example 30, 29, ..., and 0 corresponding to 31 $Q^{ref}$ values. As $Q^{ref}$ decrements, the total code amount increases. Corresponding to the count value, the address generating portion 302 supplies a read address (namely, $Q^{ref}$) to the memory 303. The total code amount is read from the address of the memory 303. The total code amount is supplied to a subtracting device 306.

A target code amount GEN_TGN is supplied to the subtracting device 306. The total code amount that is read from the memory 303 is subtracted from the target code amount GEN_TGT. A subtracted result of the subtracting device 306 is supplied to a comparator 307 and a register 308. A compared result of the comparator 307 is supplied as an enable signal to the registers 308 and 309. Output data of the register 308 is supplied to another input terminal of the comparator 307.

The comparator 307 compares the subtracted resultant data of the subtracting device 306 with the data stored in the register 308. When the subtracted resultant data is smaller than the stored data, the comparator 307 generates compared resultant data as an enable signal that is input to the registers 308 and 309. When the subtracted resultant data is negative, the comparator 307 does not generate the enable signal. Thus, after read addresses for all $Q^{ref}$ have been generated, the minimum subtracted resultant data is stored in the register 308. A count value corresponding to $Q^{ref}$ with which the minimum subtracted resultant data is generated is stored in the register 309. The count value is output as min_qq. When the subtracted resultant data becomes negative, the counting operation of the counter 305 may be stopped.

Next, with reference to FIG. 6, the process of the min_qq deciding portion 13 will be described more practically. For simplicity, it is assumed that types of quantizing steps are 1, 2, 4, 8, and 16 and that the operations performed for the quantizing steps in consideration of activities of macro blocks (namely, coefficients k) are 0.5, 1.0, and 2.0. In this case, $Q^{ref}$ and $Q^{act}$ have the relation as shown in FIG. 6A. In the case of $Q^{ref}$=2, quantizing steps $Q^{act}$ in consideration of activities are $Q^{act}$=1, $Q^{act}$=2, and $Q^{act}$=4.

Now, it is assumed that one screen is composed of four macro blocks mb0, mb1, mb2, and mb3 and that their coefficients k are (2.0, 0.5, 2.0, and 1.0), respectively. When $Q^{ref}$ of the screen are 2, 4, and 8, quantizing steps in consideration of activities of the macro blocks mbn are as shown in FIG. 6B. In the case of $Q^{ref}$=1 and $Q^{ref}$=16, quantizing steps that have been operated exceed the designated range. Thus, these reference quantizing steps are excluded. In other words, they are processed as not applicable.

Thus, the total code amount total_length ($Q^{ref}$) of one screen corresponding to $Q^{ref}$ can be expressed as follows.

total_length (2)=Length [mb0, 4]+Length [mb1, 1]+Length [mb2, 4]+Length [mb3, 2]

total_length (4)=Length [mb0, 8]+Length [mb1, 2]+Length [mb2, 8]+Length [mb3, 4]

total_length (8)=Length [mb0, 16]+Length [mb1, 4]+Length [mb2, 16]+Length [mb3, 8]

In the predicting system 3 shown in FIG. 3, for each macro block, the quantizing process is performed with all quantizing steps 1, 2, 4, 8, and 16. First of all, total_length (2), total_length (4), and total_length (8) are initialized to 0. For the first macro block mb0, Length [mb0, 1], Length [mb0, 2], Length [mb0, 4], Length [mb0, 8], and Length [mb0, 16] are obtained. Since the coefficient k for mb0 is 2, with reference to the relation between $Q^{act}$ and $Q^{ref}$ shown in FIG. 6A, code amounts corresponding to the individual reference quantizing $Q^{ref}$ can be obtained as follows.

Length [mb0, 1] . . . Not applicable (namely, there is no $Q^{ref}$ of which $Q^{act}$ is 1)

Length [mb0, 2] . . . code amount in consideration of an activity with $Q^{ref}$=1.

Length [mb0, 4] . . . code amount in consideration of an activity with $Q^{ref}$=2.

Length [mb0, 8] . . . code amount in consideration of an activity with $Q^{ref}$=4.

Length [mb0, 16] . . . code amount in consideration of an activity with $Q^{ref}$=8.

The mapping portion 301 (see FIG. 5) references the table shown in FIG. 6A. Corresponding to $Q^{ref}$ supplied from the mapping portion 301, the addresses of the memory 303 are varied and code amounts are cumulated. Thus, total_length of only the macro block mb0 is expressed as follows.

total_length (2)=Length [mb0, 4]

total_length (4)=Length [mb0, 8]

total_length (8)=Length [mb0, 16]

For the macro block mb1, since the coefficient k is 0.5, with reference to FIG. 6A, code amounts corresponding to individual reference quantizing $Q^{ref}$ can be obtained.

Length [mb1, 1] . . . code amount in consideration of an activity with $Q^{ref}$=2

Length [mb1, 2] . . . code amount in consideration of an activity with $Q^{ref}$=4

Length [mb1, 4] . . . code amount in consideration of an activity with $Q^{ref}$=8

Length [mb1, 8] . . . code amount in consideration of an activity with $Q_{ref}$=16

Length [mb1, 16] . . . not applicable

Thus, total_length of up to the macro block mb1 is expressed as follows.

total_length (2)=Length [mb0, 4]+Length [mb1, 1]

total_length (4)=Length [mb0, 8]+Length [mb1, 2]

total_length (8)=Length [mb0, 16]+Length [mb1, 4]

For the macro block mb2, since the coefficient k is 2.0, with reference to FIG. 6A, code amounts corresponding to individual reference quantizing $Q^{ref}$ can be obtained.

Length [mb2, 1] . . . Not applicable

Length [mb2, 2] . . . code amount in consideration of an activity with $Q^{ref}$=1

Length [mb2, 4] . . . code amount in consideration of an activity with $Q^{ref}$=2

Length [mb2, 8] . . . code amount in consideration of an activity with $Q^{ref}$=4

Length [mb2, 16] . . . code amount in consideration of an activity with $Q^{ref}$=8

Thus, total_length of up to the macro block mb2 is expressed as follows.

total_length (2)=Length [mb0, 4]+Length [mb1, 1]+Length [mb2, 4]

total_length (4)=Length [mb0, 8]+Length [mb1, 2]+Length [mb2, 8]

total_length (8)=Length [mb0, 16]+Length [mb1, 4]+Length [mb2, 16]

For the macro block mb3, since the coefficient k is 1.0, with reference to FIG. 6, code amounts of individual reference quantizing $Q^{ref}$ can be obtained.

Length [mb3, 1] . . . code amount in consideration of an activity with $Q^{ref}$=1

Length [mb3, 2] . . . code amount in consideration of an activity with $Q^{ref}$=2

Length [mb3, 4] . . . code amount in consideration of an activity with $Q^{ref}$=4

Length [mb3, 8] . . . code amount in consideration of an activity with $Q^{ref}$=8

Length [mb3, 16] . . . code amount in consideration of an activity with $Q^{ref}$=16

Thus, total_length of up to the macro block mb3 (namely, one screen) is expressed as follows.

total_length (2)=Length [mb0, 4]+Length [mb1, 1]+Length [mb2, 4]+Length [mb3, 2]

total_length (4)=Length [mb0, 8]+Length [mb1, 2]+Length [mb2, 8]+Length [mb3, 4]

total_length (8)=Length [mb0, 16]+Length [mb1, 4]+Length [mb2, 16]+Length [mb3, 8]

In such a manner, the total code amounts of one screen corresponding to $Q^{ref}$=2, 4, and 8 can be obtained.

With the forgoing process, the reference quantizing $Q^{ref}$ with which the total code amount does not exceed the target code amount GEN_TGT and has the minimum difference therewith is obtained as min_qq. However, since $Q^{ref}$ are discretely operated, bit rate values are also discrete values. As a result, the code amount may not be finely controlled. Thus, there is a possibility of which the difference between the total code amount and the target code amount GEN_TGT may not be sufficiently small. Thus, since quantizing steps are discrete values that are not continuous and $Q^{act}$ (mb) that can be actually used are rounded, the difference between the total code amount and target code amount GEN_TGT is more decreased. Using the rounding process, the bit rate is finely adjusted.

In other words, to slightly decrease the bit rate, Q scales of several macro blocks are increased and thereby the total code amount is decreased. At that point, Q scales that are largely rounded down in the rounding process in consideration of activities (namely, Q scales that can be expected that they can be rounded up without an adverse influence are successively rounded up). In contrast, to slightly increase the bit rate, Q scales of several macro blocks are decreased and thereby the total code amount is increased. At that point, Q scales that are largely rounded up are successively rounded down. Thus, when Q scales are varied in consideration of activities, errors of Q scales become small.

In the following example, for simplicity, it is assumed that one screen is composed of four macro blocks. To achieve a desired bit rate, it is assumed that quantizing steps that are continuous values (having at least one decimal place) in consideration of activities of individual macro blocks are (3.2, 5.9, 4.1, and 10.5). When the quantizing steps are rounded to the first decimal place, the resultant quantizing steps become (3, 6, 4, and 11). When the bit rate obtained in the combination of the quantizing steps is higher than the desired bit rate, the Q scales are varied in the following order so that the bit rate is decreased. Each value in brackets ( ) represents the difference between the original continuous value and the varied value.

3→4(0.8), 4→5(0.9), →7(1.1), 11→12(1.5)

In contrast, when the accomplished bit rate is lower than the desired bit rate, the Q scales are varied in the following order. Each value in brackets ( ) represents the difference between the original continuous value and the varied value.

11→10(0.5), 6→5(0.9), 4→3(1.1), 3→2(1.2)

The forgoing min_qq represents the case that the accomplished bit rate is lower than the desired bit rate and thereby the bit rate should be increased. Thus, a process for decreasing Q scales is required. However, when Q scales are decreased in the order of the process (namely, from a macro block at the upper left position of the screen to a macro block at the lower right position, only Q scales are controlled at the beginning of the process, not at the end of the process. Thus, the picture quality is not effectively improved. To solve such a problem, it is necessary to control quantizing steps corresponding to activity information. Next, a method for accomplishing such a process (this method is referred to as threshold method) will be described.

In the threshold method, a threshold is obtained from the relation between a target code amount and a total code amount obtained using min_qq. By comparing the threshold and the activity of each macro block, a quantizing step is narrowed. The Q_final deciding portion 14 of the predicting system 3 decides Q_final by the threshold method. Next, the threshold method will be described in detail.

While the predicting system 3 sums up code amounts to obtain min_qq, the predicting system 3 sums up code amounts with a quantizing step $Q^{ref}$ smaller than the quantizing step that satisfies Formula (2) by one quantizing step using $Q^{ref}$ as an index.

As a calculating process, with the structure shown in FIG. 5, min_qq is obtained. A code amount with min_qq is denoted by LOW_TGT. A code amount with the smaller quantizing step than min_qq by one quantizing step is denoted by UPR_TGT. The min_qq deciding portion 13 supplies the code amount LOW_TGT to the Q_final deciding portion 14. The code amount LOW_TGT is used as an initial value of a variable total in a flow chart shown in FIG. 9. In the example shown in FIG. 2, the Q scale Q4 is LOW_TGT, whereas the Q scale Q3 is UPR_TGT. The Q_final deciding portion 14 calculates a ratio of residue code amount, RES_CNT expressed by Formula (4) using these code amounts.

RES_CNT=(GEN_TGT−LOW_TGT)/(UPR_TGT−LOW_TGT) (4)

The Q_final deciding portion 14 obtains a threshold act_thresh of an activity from a pre-created lookup table using the ratio RES_CNT.

Figures 7, 8:
FIG. 7 is a schematic diagram for explaining a method for controlling quantizing steps corresponding to activity information according to the embodiment of the present invention.
FIG. 8 is a schematic diagram for explaining an example of a lookup table representing the relation between residue code amounts and thresholds according to the embodiment of the present invention.

In addition, the Q_final deciding portion 14 has a table that represents the order of which q_scale is varied for each reference quantizing $Q^{ref}$ and for each activity. FIG. 7 shows an example of a part of the table. In FIG. 7, k represents a coefficient for operating a quantizing step corresponding to activity information. In other words, k represents a coefficient portion by which $Q^{ref}$ (mb) is multiplied in Formula (3). In FIG. 7, for simplicity, the coefficient k has five discrete values (0.5, 0.75, 1.0, 1.5, and 2.0).

For example, in the case of $Q^{ref}$=10, values by which the coefficient k is multiplied are (5, 7.5, 10, 15, and 20). The values that are rounded are (5, 8, 10, 15, and 20). To increase the bit rate, 1 is subtracted from each of the rounded quantizing steps and thereby (4, 7, 9, 14, and 19) are obtained. As was described above, quantizing steps that are largely rounded are successively varied. The order of the quantizing steps that are varied is shown in FIG. 7. In the case of $Q^{ref}$=11, the similar table is created. For other $Q^{ref}$ (not shown), the order of quantizing steps that are varied are pre-obtained.

The Q_final deciding portion 14 has a lookup table that defines the threshold act_thresh of activity information for the ratio of residue code amount RES_CNT as theoretically shown in FIG. 8. As the residue code amount RES_CNT becomes large, the threshold act_thresh stepwise becomes large. The boundaries are experimentally defined. In this case, there are first rank to fifth rank. Thus, as the threshold act_thresh, one of the first rank to the fifth rank is designated.

The threshold act_thresh represents that 1 can be subtracted from the quantizing step $Q^{ref}$ of a macro block whose activity is equal to or lower than the threshold act_thresh. (act_thresh=1) represents that 1 can be subtracted from only the first ranked quantizing step. The lookup table may be another table. When the residue code amount RES_CNT is very small and quantizing steps cannot be varied, data representing that may be placed in the lookup table.

The quantizing step for a macro block having an activity more having a higher rank than the threshold is decreased (namely, fined down) by one level. The quantizing steps of other macro blocks are not varied. However, in this method, even if the quantizing steps of macro blocks having activities having higher ranks than the threshold are decreased by one level, it is not assumed that the resultant code amount does not exceed the target code amount. Thus, before the resultant code amount exceeds the target code amount, the operation for decreasing the quantizing step is stopped. Thus, after a macro block that accomplishes a target code amount, there is a possibility of which there is a macro block having an activity having a higher rank than the threshold.

Figure 9:
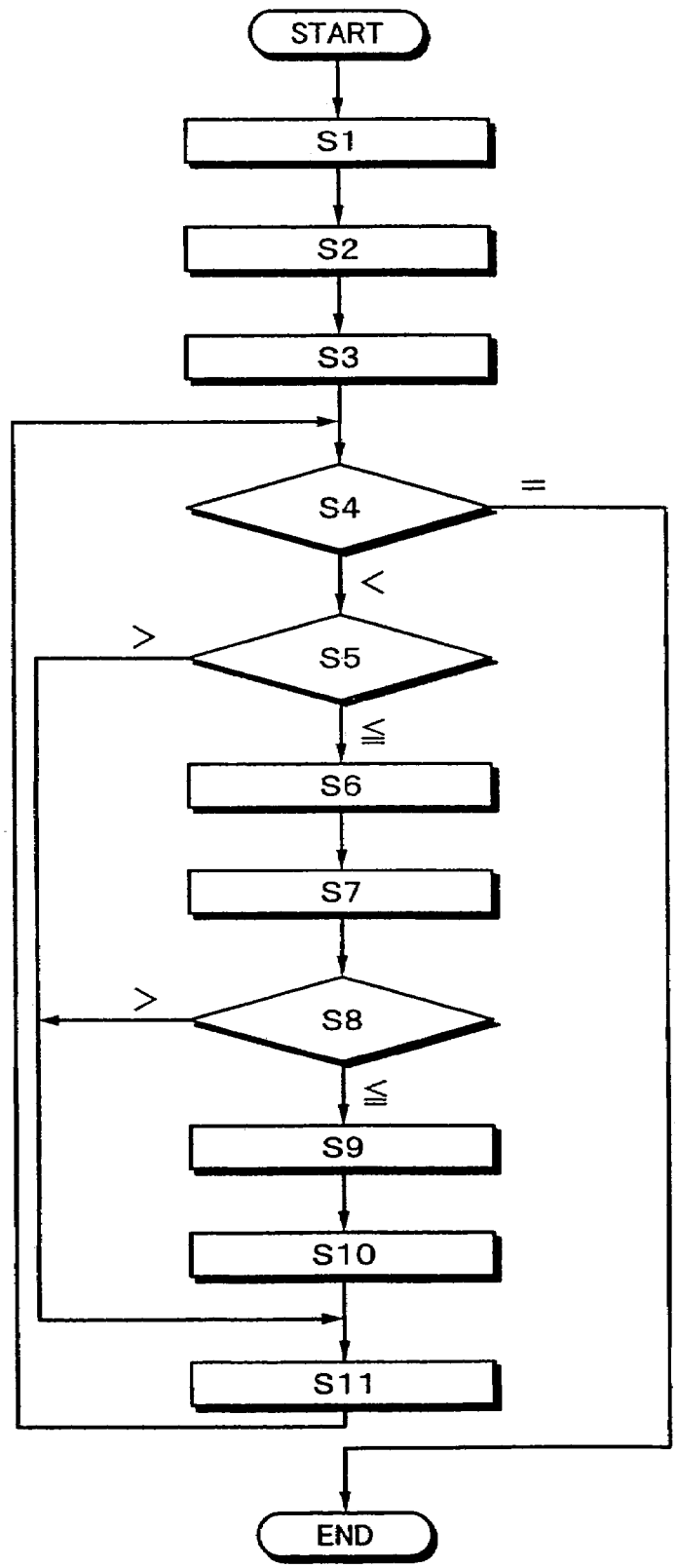
FIG. 9 is a flow chart for explaining a method for controlling quantizing steps according to the embodiment of the present invention.

FIG. 9 is a flow chart for explaining the forgoing threshold method. The Q_final deciding portion 14 decides the final quantizing step Q_final by a process shown in the flow chart. At step S1, using the result obtained by the predicting system 3, the residue code amount RES_CNT expressed by Formula (4) is calculated. At step S2, with reference to the lookup table shown in FIG. 8, the threshold act_thresh of the activity is obtained.

At step S3, a variable mb as an index of a macro block is initialized to 0. At step S4, the variable mb is compared with the total number of macro blocks MB_NUM. When the relation of mb=MB_NUM is satisfied, since all the macro blocks have been processed, the process for the threshold method is completed. Otherwise, the flow advances to step S5.

At step S5, the rank of the activity information of the macro block is compared with the rank of act_thresh. When the rank of the activity information is higher than the rank of act_thrsh, since there is a possibility of which q_scale can be decreased, the flow advances to step S6. Otherwise, the flow advances to step S11.

At step S6, q_scale is calculated with the activity information of the macro block mb and min_qq. At step S7, the code amount of the macro block of which the quantizing step has not been decreased is subtracted from the total code amount (total). In addition, the code amount of the macro block of which the quantizing step is decreased by one is added to the total code amount. As a result, the total code amount of which the quantizing step of the macro block is decreased by one (the total code amount is increased from the preceding code amount) is obtained. The new total code amount is stored in the variable tmp.

At step S8, the variable tmp is compared with the target code amount GNE_TGT. When the variable tmp is equal to or smaller than the target code amount GEN_TGT, since the quantizing step can be decreased, the flow advances to step S9. Otherwise, the flow advances to step S11. At step S9, the quantizing step of the macro block mb is decreased by one. At step S10, the variable total that represents the total code amount is updated. At step S11, the macro block mb is incremented. Thereafter, the flow returns to step S4.

The present invention is not limited to the forgoing embodiment. Instead, without departing from the sprit of the present invention, various modifications and ramifications are possible.

For example, the present invention is not limited to DCT. Instead, the present invention can be applied to other transform encoding processes such as wavelet transform, Haar transform, and K-L transform.

In addition, the present invention can be applied to the case that compressed and encoded data is recorded on a magnetic tape, hard disk, and magneto-optical disc. In addition, the present invention can be applied to the case that compressed data is transmitted through a network.

In addition, the present invention is not limited to the macro block structure (4:2:0). Instead, the present invention can be applied to macro block structures (4:2:2), (4:4:4), (4:1:1), and so forth. In addition, the number of DCT blocks contained in one macro block is not limited. In addition, as the equal length unit for controlling a code amount, a shorter period than one frame can be designated.

According to the present invention, since quantizing steps are varied corresponding to local characteristics of a picture, the picture quality of a decoded picture can be improved. In this case, in consideration of a process for rounding quantizing steps compensated with activity information, the priority ranks of quantizing steps that are varied are designated. In addition, with a table correlating thresholds and residue code amounts, a threshold is decided. When a macro block has an activity with a higher rank than the threshold, the quantizing step is decreased by one level. When an quantizing step is controlled corresponding to an activity, the quantizing step can be controlled corresponding to a residue code amount.

The invention claimed is:

1. A video signal quantizing apparatus for quantizing a video signal in each equal length unit composed of a plurality of blocks within a target code amount, the apparatus comprising:
   total code amount detecting means for obtaining a total code amount generated in the equal length unit of the video signal with each of a plurality of quantizing steps when the video signal is quantized with the plurality of different quantizing steps;
   first deciding means for deciding a first quantizing step from the plurality of quantizing steps, the first quantizing step being a quantizing step with which the total code amount is smaller than a target code amount and a difference of the total code amount and the target code amount is minimum;
   activity detecting means for detecting an activity for each block of the video signal, said activity being a variance of a plurality of pixel values constituting the block;
   second deciding means for deciding a second quantizing step by varying the first quantizing step according to the activity of each block;
   residue code amount detecting means for detecting a residue code amount that is a difference between a code amount of which all of the plurality of blocks in the equal length unit of the video signal are quantized with the first quantizing step and the total code amount;
   priority rank deciding means for deciding a priority rank of each block according to an error by rounding when the second quantizing step is decided in consideration of the activity;
   third deciding means for deciding a third quantizing step by varying the second quantizing step for a block selected according to the priority rank; and
   quantizing means for quantizing each block with a quantizing step decided by the second deciding means or the third deciding means.

* * * * *